No. 809,742. PATENTED JAN. 9, 1906.
D. P. PERRY.
STORAGE BATTERY PLATE.
APPLICATION FILED JUNE 8, 1903.
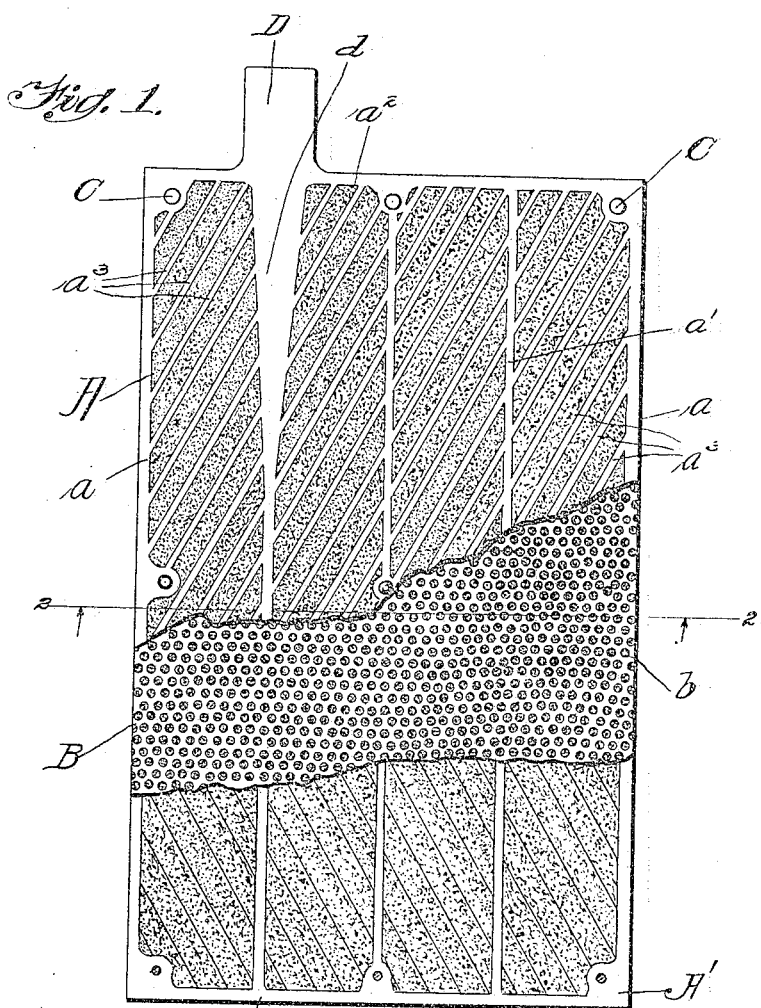
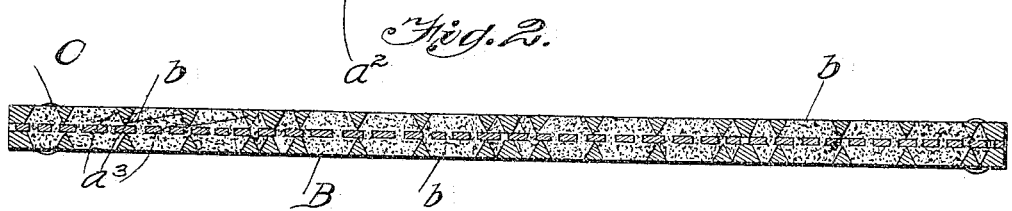
Witnesses:
Robert H. Weir
J. B. Weir
Inventor:
David P. Perry.
By Buckley & Durand
Attys.

UNITED STATES PATENT OFFICE.

DAVID P. PERRY, OF CHICAGO, ILLINOIS.

STORAGE-BATTERY PLATE.

No. 809,742.　　　　Specification of Letters Patent.　　　　Patented Jan. 9, 1906.

Application filed June 8, 1903. Serial No. 160,467.

*To all whom it may concern:*

Be it known that I, DAVID P. PERRY, a citizen of the United States of America, and a resident of Chicago, Cook county, Illinois, have invented a certain new and useful Improvement in Storage - Battery Plates, of which the following is a specification.

It is desirable and important in storage-battery plates that the construction be such as to prevent the active material from becoming dislodged from the grid or metal support. Again, it is important and desirable that the plate be of such character as to combine lightness with strength and rigidity. Another feature which is desirable and important is to so construct the plate that the internal resistance of the battery will be as low as possible, and particularly to so construct the plate that the resistance between the active material and the grid or support will be reduced to a minimum. In other words, it is important and desirable that no part of the active material be more than three thirty-seconds of an inch away from the grid or support. Prior to my invention the foregoing features and advantages have been employed or realized to some extent in various kinds of storage-battery plates. For example, some of the plates constructed prior to my invention have possessed the advantage and desirable feature of having a formation of the grid or support which prevented the active material from falling off or becoming dislodged, but not the feature of having a plate which combined lightness with strength and rigidity. Again, some of the plates constructed prior to my invention have been to a greater or less extent of a character to prevent the active material from becoming dislodged, but not of a character to insure high conductivity between the active material and the grid or support, and, on the other hand, battery-plates have been constructed prior to my invention which perhaps in a fair degree insured a low internal resistance and a fairly good conductivity between the active material and the support or grid, but at the expense of having the plate either much too heavy or too weak or perhaps of a character not to prevent the active material from becoming dislodged. Also in some cases the plates have been so constructed that, while they combined the features of lightness, strength, and rigidity and were adapted to hold the active material firmly and prevent it from dropping off or becoming dislodged, they did not, however, possess the advantage and desirable feature of having no part of the active material more than three thirty-seconds of an inch away from the metal grid or support, or approximately so, and consequently were not adapted to insure a low internal resistance, and particularly were not adapted to insure a relatively low or practically minimum resistance between the metal support and the material which is actually active during the discharge of the battery.

Generally stated, the object of my invention is to provide a highly efficient and comparatively inexpensive construction of storage-battery plate. A special object, however, is to provide a storage-battery plate in which all of the previously-explained important features and advantages are embodied or realized to a greater extent than heretofore and possessing or embodying also the various other features and advantages which are well known to those skilled in the art and which will in all ways meet the requirements of approved methods and practices.

To these and other useful ends my invention consists in matters hereinafter set forth and claimed.

In the accompanying drawings, Figure 1 is a face view or side elevation of a storage-battery plate embodying the principles of my invention, certain portions being broken away for the purpose of showing the construction of the grid or support. Fig. 2 is an enlarged cross-section on line 2 2 in Fig. 1.

As thus illustrated, my improved storage-battery plate may comprise a pair of flat or practically flat plates A and A′, composed of suitable metal—as, for example, lead. These flat metal plates constitute the outer grid members and are preferably constructed with vertical side and intermediate ribs $a$ and $a'$ and also with top and bottom horizontal ribs $a^2$. The spaces between the vertical ribs are occupied by oblique ribs or connecting-strips $a^3$. When placed flatwise together, the ribs $a^3$ of one grid member cross the like ribs of the other grid member at an angle, as shown in Fig. 1. By referring to Fig. 2 it will be seen that all of said ribs, and particularly the ribs $a^3$, are wedge-shaped in cross-section and taper inwardly. Preferably and as a matter of further and special improvement these two flat or practically flat outer grid members are separated by an intermediate flat perforated plate or inner grid member B, which is in the nature of a screen and which is provided with evenly-distributed and closely-arranged apertures b. As will be observed, this inner grid member or intermediate foraminous or reticulated metal sheet is of less thickness than the outer members A and A'. The three apertured or perforated lead plates thus constructed can be secured flatwise together by means of lead rivets C, inserted through openings provided at appropriate places. Thus constructed it will be seen that my improved grid or support is provided at each side or face with a plurality of parallel and obliquely-disposed channels or cavities which taper outwardly, the cavities at one side of the grid or support being connected with those at the other side by means of the small openings or apertures in the intermediate grid member or screen B. Consequently the paste when applied to the grid and pressed into the cavities becomes separated into strips which are wedge-shaped in cross-section—that is to say, which taper outwardly in cross-section—and are not, therefore, liable to become dislodged from the grid or support. Furthermore, the plate is both light and strong, the arrangement of the ribs being such that there are practically no weak lines and such that the plate cannot be easily bent or broken in any direction. Again, with the provision of the intermediate reticulated sheet B no part of the active material need be more than three thirty-seconds of an inch away from the metal of the grid or support, or approximately so, according to the size and dimensions of the plate. Thus in this way the outwardly-tapering strips of hardened paste which fill the cavities at each side of the grid are connected by the portions of the hardened paste which fills the openings or apertures in the web or intermediate grid member B. So while the grid or support is desirably and advantageously constructed of flat apertured plates which are riveted together, and while the formation of these plates or grid members is such as to provide outwardly-tapering cavities, so as to insure a "dovetailed" fastening, so to speak, between the active material or hardened paste and the grid or metal support, the construction is at the same time characterized by the presence of a centrally-located web or flat sheet. Thus the grid or support is not only of a strong and inflexible or practically non-breakable character and is not only of a character to provide outwardly-tapering pockets or apertures from which the hardened paste or active material cannot possibly be dislodged, but is also of a character to insure a very high degree of conductivity—that is to say, the relative distribution of the active material and the metal of the plate is such that no portion of the active material is farther away from the metal than the limit which has been established by experience and good practice. All of the metal of the plate is a support for the active material, as well as a conductor.

All three of the grid members are preferably provided at their tops with extensions adapted to form a terminal D. Also, as a matter of further improvement, the grid members A and A' are formed with tapering strengthening or reinforcing pieces d, leading downward for a suitable distance immediately below the said plate-terminal D. As illustrated, these strengthening or reinforcing portions d are merely enlargements of the upper portions of one of the ribs a' of each of the outer grid members. This feature adds materially to the strength and serviceability of the plate.

It will be readily understood that the active material of my improved storage-battery plate may be of any suitable known or approved character. For example, it may consist of a hardened paste formed by mixing red lead or litharge or the like with suitable ingredients. The grid or support can be of any suitable material, such as lead.

What I claim as my invention is—

1. As an article of manufacture, a storage-battery grid, comprising three flat superimposed lead members, the two outer members being provided with a plurality of vertically-disposed columns of obliquely-arranged outwardly-tapering apertures, the obliquely-arranged apertures of one member being arranged at an angle to the obliquely-arranged apertures of the other member, and the intermediate member being provided with evenly-distributed small openings or perforations.

2. As an article of manufacture, a storage-battery grid having its opposite sides provided with parallel and obliquely-arranged outwardly-tapering pockets arranged in a plurality of vertically-disposed columns, the pockets at one side being arranged at an angle to the pockets at the other side, and having also a perforated web separating the pockets at one side from the pockets at the other side.

3. As an article of manufacture, a storage-battery grid composed of superimposed plates having upwardly-extending projections adapted to form a terminal for the battery-plate, and having also strengthening or reinforcing portions tapering downwardly from said terminal.

Signed by me at Chicago, Illinois, this 6th day of June, 1903.

DAVID P. PERRY.

Witnesses:
 CHAS. C. BULKLEY,
 WM. A. HARDERS.